May 3, 1938.  A. HOWIE ET AL  2,116,150
APPARATUS FOR HANDLING FREIGHT CONTAINERS
Filed May 18, 1936  2 Sheets-Sheet 1
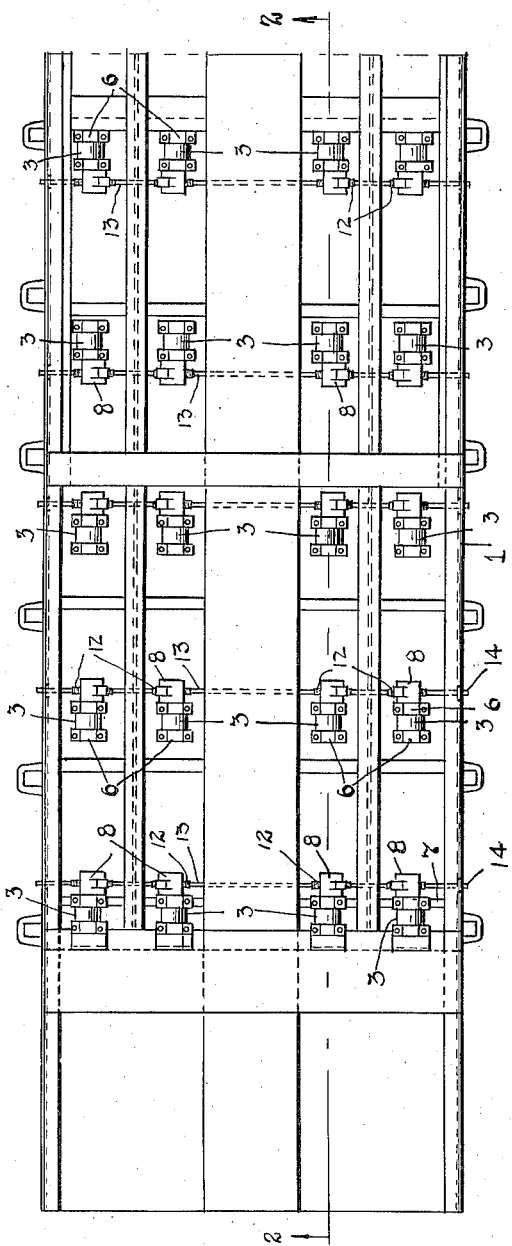
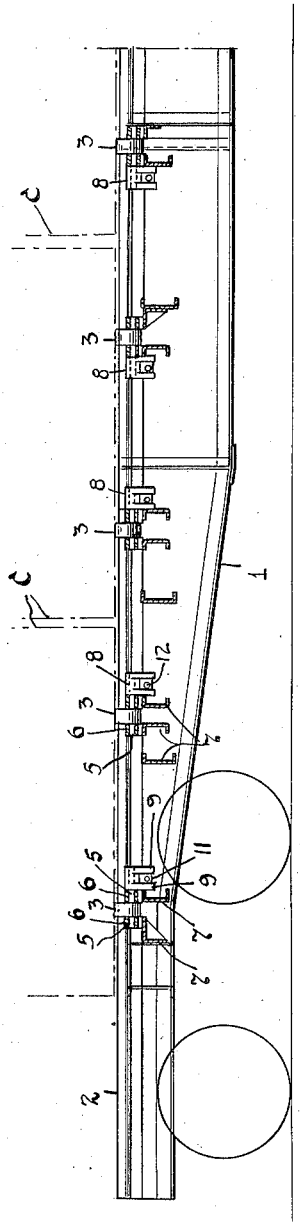
INVENTORS
Alexander Howie and
Charles H. Bradley
BY Fay, Oberlin & Fay
ATTORNEYS.

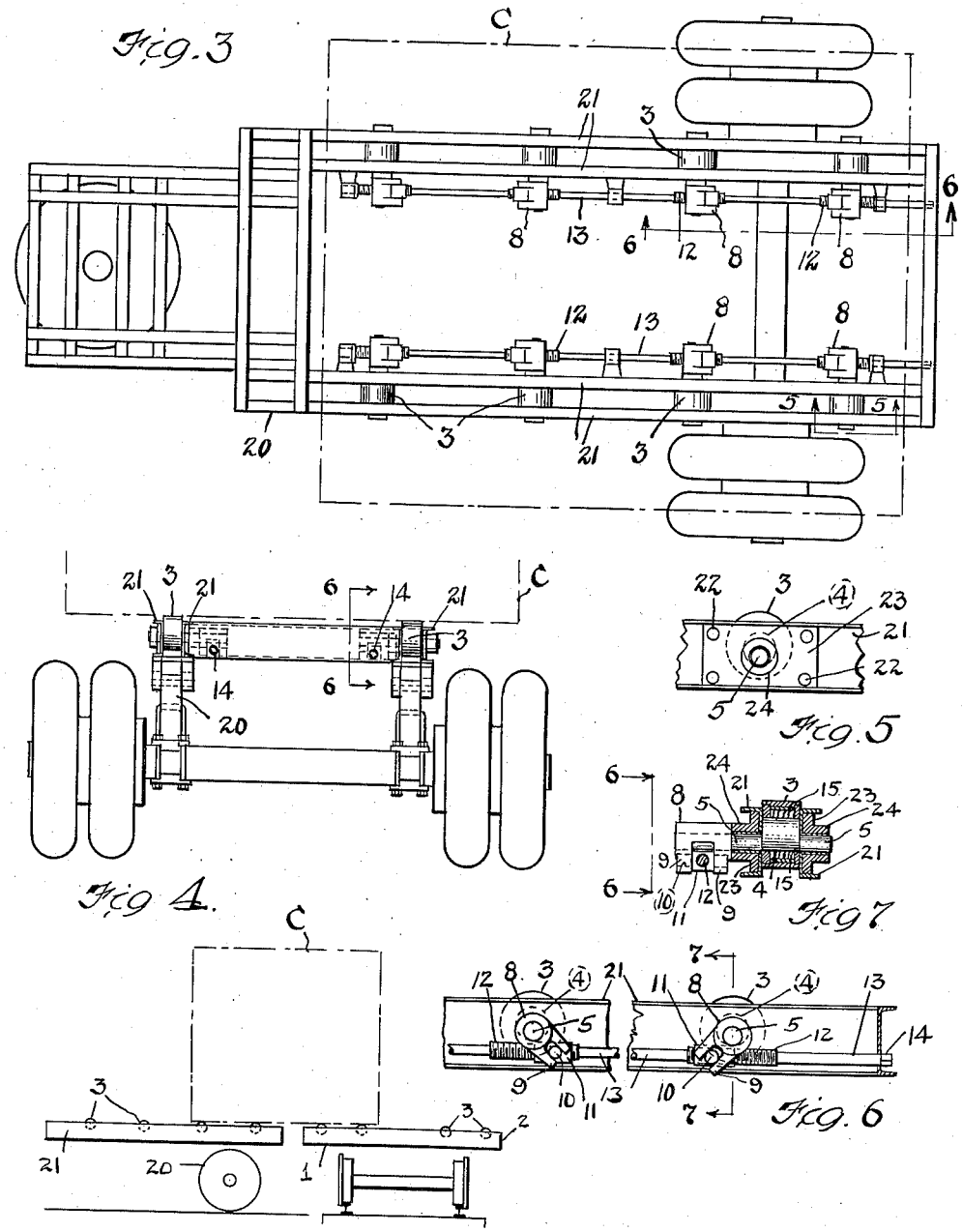

Patented May 3, 1938

2,116,150

UNITED STATES PATENT OFFICE 2,116,150

APPARATUS FOR HANDLING FREIGHT CONTAINERS

Alexander Howie, Shaker Heights, and Charles H. Bradley, Cleveland, Ohio; said Bradley assignor to said Howie Application May 18, 1936, Serial No. 80,318

6 Claims. (Cl. 214—84)

This invention relates, as indicated, to apparatus for handling freight containers, but has reference more particularly to apparatus for handling freight containers of the character described in our co-pending application Serial No. 72,170, filed April 1, 1936, that is, containers of the class commonly known as L. C. L. or less-than-carload-lot containers.

Containers of the aforesaid class usually have standard dimensions to provide a volume of about 500 cu. ft., and are designed for a load capacity of about 25,000 pounds, and in view of these factors, the problem of facilitating the handling of the containers, as in shifting them from railroad freight cars to the trailers of motor vehicles and vice versa, is of considerable importance.

It is a primary object of the present invention to provide apparatus for greatly facilitating the shifting or rolling of such containers from the railroad freight cars on which they are usually shipped to the trailers of motor vehicles on which they are transported to their destination.

Another object of the invention is to provide such apparatus as a permanent part of the freight car or trailer, thereby avoiding the incorporation of transportation facilitating apparatus in the containers themselves, where such mechanism is virtually dead weight and reduces the effective volume and capacity of the containers.

A further object of the invention is to provide apparatus of the aforesaid character which is of comparatively simple construction and which can be quickly and easily operated by means of simple tools.

To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but a few of the various structural forms in which the principle of the invention may be used.

In said annexed drawings:

Fig. 1 is a plan view of half of a railroad freight car embodying the invention with the flooring or floor boards omitted to more clearly show the apparatus for facilitating shifting of the containers; Fig. 2 is a longitudinal cross-sectional view, taken on the line 2—2 of Fig. 1; Fig. 3 is a plan view of a motor vehicle trailer embodying the invention; Fig. 4 is a rear elevation of the trailer; Fig. 5 is a fragmentary elevation of a portion of the apparatus, as viewed in the direction indicated by the line 5—5 of Fig. 3; Fig. 6 is a fragmentary elevation of the apparatus, as viewed in the direction indicated by the lines 6—6 of Figs. 3, 4 and 7; Fig. 7 is a view, partly in section and partly in elevation, as indicated by the line 7—7 of Fig. 6; and Fig. 8 is a view showing the shifting of a container from a freight car to a trailer, and in which the car and trailer are both equipped with the novel means for facilitating the shifting of the container.

Referring more particularly to that form of the invention shown in Figs. 1 and 2, there is disclosed one half of a freight car 1, provided with the usual flooring 2, having openings therein at suitably spaced intervals for permitting rollers 3 to project upwardly therethrough. These rollers are arranged in rows extending transversely of the car 1, and the rows of rollers are spaced longitudinally of the car so as to provide two rows of rollers for facilitating the rolling of each container C, as indicated in Fig. 2.

Each roller 3 is supported in a frictionless manner on a shaft 4, which is provided with eccentric pins or trunnions 5, which are mounted for rocking movement in bearings 6, these bearings being supported by transversely extending structural members 7 of the car 1.

One of the trunnions 5 is extended beyond the bearing to provide a portion to which is keyed or otherwise rigidly secured a rocking lever 8 having downwardly extending arms 9 which straddle pins 10 extending from opposite sides of a sleeve 11. The sleeve 11 is square in external cross-section, extends through the space between the downwardly extending arms 9 of lever 8, and is in threaded engagement with a threaded portion 12 of a shaft 13. The shaft 13 is suitably supported in the frame of the car for rotation, and it will be noted that the threaded portions 12 for each adjacent pair of rocking members 8 are reversely threaded with respect to each other. This permits the rocking members of each pair to be inclined towards each other so as to avoid any tendency of the containers moving forwardly or rearwardly when the rollers are raised or lowered.

The shaft 13 is provided at one end with a squared portion 14, whereby a wrench may be applied to rotate the shaft and raise or lower each row of rollers 3 in unison. In raising the rollers, they are raised but a slight distance above the upper surface of the flooring 2, and in lowering the rollers, they are lowered below such surface sufficiently to permit the insertion of blocks in the openings through which the rollers move, these blocks (not shown) preventing the accumulation of dirt in the openings when the rollers are not in service.

When the rollers underlying each container C are raised to the desired extent, the container may be rolled without difficulty onto a trailer or car siding platform, as will be readily understood, the rolling action being greatly facilitated by virtue of the frictionless mounting of the rollers 3 on the shafts 4. For this mounting, bearing rollers 15 may be employed, as shown in Fig. 7.

In Figs. 3 to 6 inclusive, there is disclosed a motor vehicle trailer 20, which embodies means for facilitating rolling of a container. For this purpose, the trailer is provided with two pairs of longitudinally-extending transversely-spaced channels 21, and each row of rollers 3 is positioned between the webs of each pair of such channels. These channels have secured thereto, as by rivets 22, plates 23 which are provided at their centers with bearings 24, in which are mounted the trunnions 5 of the roller shafts 4. The rollers 3 are raised and lowered with respect to the upper flanges of the channels 21 by means of mechanism which is similar in all respects to that employed for raising and lowering the rollers 3 of the apparatus shown in Figs. 1 and 2. Further description thereof is therefore deemed unnecessary.

In shifting a container C from the car to a trailer, as shown in Fig. 8, the container will first be elevated above the surface of the flooring 2 of the car in the manner previously described. The rollers 3 of the trailer will then be elevated in a similar manner, and the trailer backed to a point adjacent the side of the freight car. With the car and trailer thus positioned, the container can be readily pushed from the car to the trailer. With the container properly positioned on the trailer, the rollers 3 are lowered so as to permit the container to rest directly on the flanges 21 of the trailer.

It will be further understood that apparatus of the foregoing character may be used on a car siding platform for facilitating loading of containers onto such platform or in moving containers from such platforms to freight cars.

Other modes of applying the principle of our invention may be employed instead of the one explained, change being made as regards the means herein disclosed, provided those stated by any of the following claims or their equivalent be employed.

We therefore particularly point out and distinctly claim as our invention:—

1. In combination with a container carrying vehicle having a floor, said floor having transversely extending longitudinally spaced rows of openings therein, rollers mounted for vertical movement in each of said openings, bearings, shafts supporting said rollers, and having eccentric trunnions journalled in said bearings, and means for simultaneously rocking the shafts in each of said rows whereby to raise or lower said rollers, said means comprising levers secured to and extending radially from the trunnions at one end of each of the shafts and means for rocking all of said levers in unison.

2. In combination with a container carrying vehicle having a supporting surface, spaced rows of rollers mounted for vertical movement above and below said surface, bearings, shafts supporting said rollers and having eccentric trunnions journalled in said bearings, the trunnions at the same end of each of the shafts in a single row of rollers extending beyond the bearings in which they are journalled, and means for simultaneously rocking the shafts in each of said rows whereby to raise or lower said rollers, said means comprising levers secured to said trunnion extensions and extending radially thereof, and means for rocking all of said levers in unison.

3. In a motor vehicle trailer, spaced pairs of longitudinally extending transversely spaced structural members having flat upper surfaces, rollers mounted between the members of each of said pairs for movement above and below said surfaces, shafts supporting said rollers and having eccentric trunnions journalled in said members, and means for simultaneously rocking the shafts in each of said rows whereby to raise or lower said rollers, said means comprising levers secured to and extending radially from the trunnions at one end of each of the shafts in a single row and means for rocking all of said levers in unison.

4. In a motor vehicle trailer spaced pairs of longitudinally extending transversely spaced channels having their webs in opposed relation and flanges thereof defining a common supporting surface for containers and the like, a row of rollers positioned between the webs of each pair of channels, said rollers mounted for movement above and below said surface, shafts supporting said rollers and having eccentric trunnions journalled in said webs, and means for simultaneously rocking the shafts in each of said rows whereby to raise or lower said rollers, said means comprising levers secured to and extending radially from the trunnions at one end of each of the shafts in a single row, and means for rocking all of said levers in unison.

5. In apparatus of the character described, a container supporting surface, spaced rows of rollers movable vertically with respect to said surface, shafts for rotatably supporting said rollers, said shafts having eccentric trunnions, bifurcated levers secured to the trunnions at the same ends of the shafts in each of said rows, sleeves having pins extending between the furcations of each of said levers, said sleeves being internally threaded, and a rotatable shaft having threaded portions engaging said sleeves whereby rotation of said shaft operates to simultaneously rock all of the levers to raise or lower said rollers.

6. In apparatus of the character described, a container supporting surface, spaced rows of rollers movable vertically with respect to said surface, shafts for rotatably supporting said rollers, said shafts having eccentric trunnions, bifurcated levers secured to and extending radially from the trunnions at the same ends of the shafts in each of said rows, said levers being arranged in pairs with the rocking levers of each pair inclined towards each other, sleeves having pins extending between the furcations of each of said levers and a rotatable shaft having threaded portions in threaded engagement with said sleeves whereby rotation of said shaft operates to simultaneously rock all of the levers to raise or lower said rollers, the portions of said shaft for each pair of rocking levers being reversely threaded with respect to each other.

ALEXANDER HOWIE.
CHARLES H. BRADLEY.